United States Patent
Le

(10) Patent No.: US 12,438,905 B1
(45) Date of Patent: Oct. 7, 2025

(54) ANOMALY DETECTION IN COPPER NETWORKS

(71) Applicant: FRONTIER COMMUNICATIONS HOLDINGS, LLC, Dallas, TX (US)

(72) Inventor: Victor C. Le, Vancouver, WA (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 19/005,816

(22) Filed: Dec. 30, 2024

(51) Int. Cl.
  *H04L 9/40* (2022.01)
  *H04L 12/28* (2006.01)
  *H04L 41/16* (2022.01)

(52) U.S. Cl.
  CPC ...... *H04L 63/1433* (2013.01); *H04L 12/2878* (2013.01); *H04L 41/16* (2013.01)

(58) Field of Classification Search
  CPC ............ H04L 12/2856; H04L 12/2872; H04L 12/6418; H04L 41/0213; H04L 41/5003; H04L 47/6215; H04L 12/2898; H04L 2012/6424; H04L 47/76; H04L 49/30; H04L 65/40; H04L 2012/563; H04L 41/0806; H04L 41/0856; H04L 41/0896; H04L 41/5022; H04L 12/2867; H04L 12/2878; H04L 2012/5615; H04L 43/087; H04L 12/2889; H04L 12/4633; H04L 2012/6445; H04L 2012/6486; H04L 25/0384; H04L 25/4902; H04L 27/0004; H04L 41/06; H04L 41/08; H04L 41/145; H04L 41/147; H04L 41/149; H04L 41/5087; H04L 45/10; H04L 45/50; H04L 47/10; H04L 49/602; H04L 5/1469; H04L 61/00; H04L 65/1043; H04L 65/1101;
  (Continued)

(56) References Cited

U.S. PATENT DOCUMENTS 10,902,062 B1 * 1/2021 Guha ............... G06F 16/9027
2010/0316050 A1 * 12/2010 Baykal ................ H04L 47/29
                                                                370/400
(Continued)

OTHER PUBLICATIONS

Goix et al., "On anomaly ranking and excess-mass curves", Retrieved from the Internet at: <URL:https://hal.science/hal-01113521v1> (2014).

*Primary Examiner* — Djenane M Bayard
(74) *Attorney, Agent, or Firm* — MARSHALL, GERSTEIN & BORUN LLP

(57) ABSTRACT

Techniques for detecting one or more anomalies in a copper network include extracting a plurality of features from historical data of a copper network, transforming the historical data to generate additional features, and training a machine learning model on the historical data, the extracted features, and the additional features to discover prevailing, normal, or typical historical behaviors or features of the copper network and/or of its components while operating in a target or desired operating range. An anomaly detector of the copper network may utilize the trained ML model on current copper network data to detect one or more anomalies within the current copper network, and initiate respective mitigating actions. The ML model may be optimized by validating the trained ML model and tuning hyperparameters to optimize performance. In an example, optimizing the trained ML model may be based on excess mass curves.

27 Claims, 4 Drawing Sheets

(58) Field of Classification Search
CPC ..... H04L 65/1104; H04L 65/80; H04L 67/10;
H04L 67/63; H04L 69/08; H04L 12/18;
H04L 12/2801; H04L 12/2861; H04L
12/2869; H04L 12/2876; H04L 12/5692;
H04L 2012/561; H04L 2012/5612; H04L
2012/5663; H04L 2012/5665; H04L
2012/6427; H04L 2012/6478; H04L
25/08; H04L 25/14; H04L 27/2602; H04L
27/26025; H04L 41/04; H04L 41/0813;
H04L 41/344; H04L 41/5054; H04L
43/0858; H04L 43/0864; H04L 43/106;
H04L 47/525; H04L 47/72; H04L 47/781;
H04L 47/805; H04L 5/023; H04L
63/0435; H04L 67/14; H04L 69/28; H04L
1/0002; H04L 1/0009; H04L 12/2883;
H04L 12/4641; H04L 2012/5605; H04L
2012/5606; H04L 2012/5632; H04L
2012/5639; H04L 2012/5667; H04L
2012/6472; H04L 2012/6475; H04L
2025/03426; H04L 25/03343; H04L
25/03891; H04L 41/0677; H04L 41/142;
H04L 43/0894; H04L 43/50; H04L
47/196; H04L 47/215; H04L 47/22; H04L
47/24; H04L 47/25; H04L 47/27; H04L
47/283; H04L 63/0428; H04L 7/0008;
H04L 7/0075; H04L 12/2896; H04L
12/5601; H04L 2012/5614; H04L
2012/5626; H04L 41/0233; H04L 5/0042;
H04L 5/0044; H04L 5/14; H04L 5/143;
H04L 5/1446; H04L 41/16; H04L
43/0888; H04L 63/1425; H04L 63/1433;
H04L 63/145; H04L 67/02; H04L 67/535;
H04L 2209/84; H04L 41/0631; H04L
41/0654; H04L 41/40; H04L 41/5019;
H04L 41/5067; H04L 41/507; H04L
41/5074; H04L 47/788; H04L 47/83;
H04L 63/08; H04L 63/126; H04L 9/3239;
H04L 9/50; H04B 3/32; H04B 1/7163;
H04B 1/7172; H04B 3/487; H04B 10/58;
H04B 3/20; H04B 3/23; H04B 3/46;
H04B 3/493; H04B 3/54; H04B 7/0456;
G06N 20/00; G06N 20/20; G06N 3/08;
G06N 7/01; G06N 5/01; G06N 3/045;
G06N 20/10; G06N 5/04; G06N 3/084;
G06N 3/044; G06N 3/0464; G06N 3/048;
G06N 3/04; G06N 5/00; G06N 7/02;
G06N 3/047; G06N 3/126; G06N 5/045;
G06N 7/00; G06N 3/042; G06N 3/0455;
G06N 3/082; G06N 3/088; G06N 5/022;
G06N 3/02; G06N 3/0495; G06N 3/0895;
G06N 3/00; G06N 3/006; G06N 3/049;
G06N 3/063; G06N 3/065; G06N 3/092;
G06N 3/094; G06N 3/09

See application file for complete search history.

(56) References Cited

U.S. PATENT DOCUMENTS

| | | | |
|---|---|---|---|
| 2013/0045014 A1* | 2/2013 | Mottahedin | H04L 63/08 |
| | | | 455/90.3 |
| 2015/0085994 A1* | 3/2015 | Koyabe | G08B 13/00 |
| | | | 379/22.03 |
| 2020/0112489 A1* | 4/2020 | Scherger | H04L 41/12 |

* cited by examiner

ANOMALY DETECTION IN COPPER NETWORKS

FIELD OF THE DISCLOSURE

This disclosure relates generally to copper data and/or communication networks and, more particularly, to systems and methods for detecting anomalies in a copper network.

BACKGROUND

A copper network typically includes one or more digital service line access multiplexers (DSLAM) at a central location connecting to one or more residential gateways (RGs) disposed at respective customer premises (e.g., physical locations serviced by the copper network) via one or more copper cables. A copper network is typically implemented using a point-to-multipoint topology in which copper cable from a DSLAM serves multiple RGs. An RG connects a local area network (e.g., at customer premises) to a wide area network (e.g., the Internet) and may include, for example, a modem and/or a router.

Copper networks may suffer issues including service degradations and outages. Currently, such issues are detected when a customer contacts technical support, or when monitoring tools flag an incident. While customer reports and the currently-used monitoring tools are useful for identifying short-term or standalone issues, long-term issues may not be identified. For example, customers may neglect to report degradation in their service. Additionally, some issues are inconspicuous and may be difficult to detect or be noticed by customers. Once an issue is reported and identified, the issue may already be severe.

SUMMARY

In an embodiment, a method for detecting sources of anomalies in a copper network may include obtaining historical data associated with a copper network. The historical data may include data indicative of a multiplicity of historical copper network components, a multiplicity of historical operating behaviors of the copper network which have occurred, a multiplicity of historical events corresponding to the copper network which have occurred, and a multiplicity of historical anomalies which have occurred in the copper network, for example. The method may also include extracting, from the historical data, a plurality of copper network component features, where each copper network component feature may be indicative of a behavior of a respective copper network component, and transforming, by using one or more statistical aggregation techniques, the historical data thereby generating additional copper network component features.

Additionally, the method may include training a machine learning model on the historical data, the extracted plurality of copper network component features, and the additional copper network component features to discover one or more historical features of the copper network having respective strengths of associations with one or more historical anomalies, of the copper network, that are greater than respective strengths of associations of other historical features of the copper network with the one or more historical anomalies. The training may include reducing a number of variables in the historical data, and tuning one or more model attributes of the machine learning model based on validating the machine learning model. Further, the method may include detecting, based on current data of the copper network and by utilizing the trained machine learning model, one or more sources of one or more anomalies occurring in the copper network, and initiating, by the one or more processors and responsive to the detecting, a mitigating action for the detected one or more sources of the one or more anomalies occurring in the copper network.

In another embodiment, a system for detecting sources of anomalies in copper network includes one or more processors and one or more memories storing computer-executable instructions that, when executed, cause the one or more processors to obtain historical data associated with a copper network, where the historical data may include data indicative of a multiplicity of historical copper network components, a multiplicity of historical operating behaviors of the copper network which have occurred, a multiplicity of historical events corresponding to the copper network which have occurred, and a multiplicity of historical anomalies which have occurred in the copper network, for example. The execution of the computer-executable instructions may further cause the system to extract, from the historical data, a plurality of copper network component features, where each copper network component feature may be indicative of a behavior of a respective copper network component, and transform, by using one or more statistical aggregation techniques, the historical data to generate additional copper network component features.

The execution of the computer-executable instructions may still further cause the system to train a machine learning model on the historical data, the extracted plurality of copper network component features and the additional copper network component features to discover one or more historical features of the copper network having respective strengths of associations with one or more historical anomalies, of the copper network, that are greater than respective strengths of associations of other historical features of the copper network with the one or more historical anomalies. The training may include reducing a number of variables in the historical data and tuning one or more model attributes of the machine learning model based on a validation of the machine learning model, for example. Additionally, the execution of the computer-executable instructions may cause the system to detect, based on current data of the copper network and a utilization of the trained machine learning model, one or more sources of the one or more anomalies, and to initiate a mitigating action for the detected one or more sources of the one or more anomalies occurring in the copper network.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1:
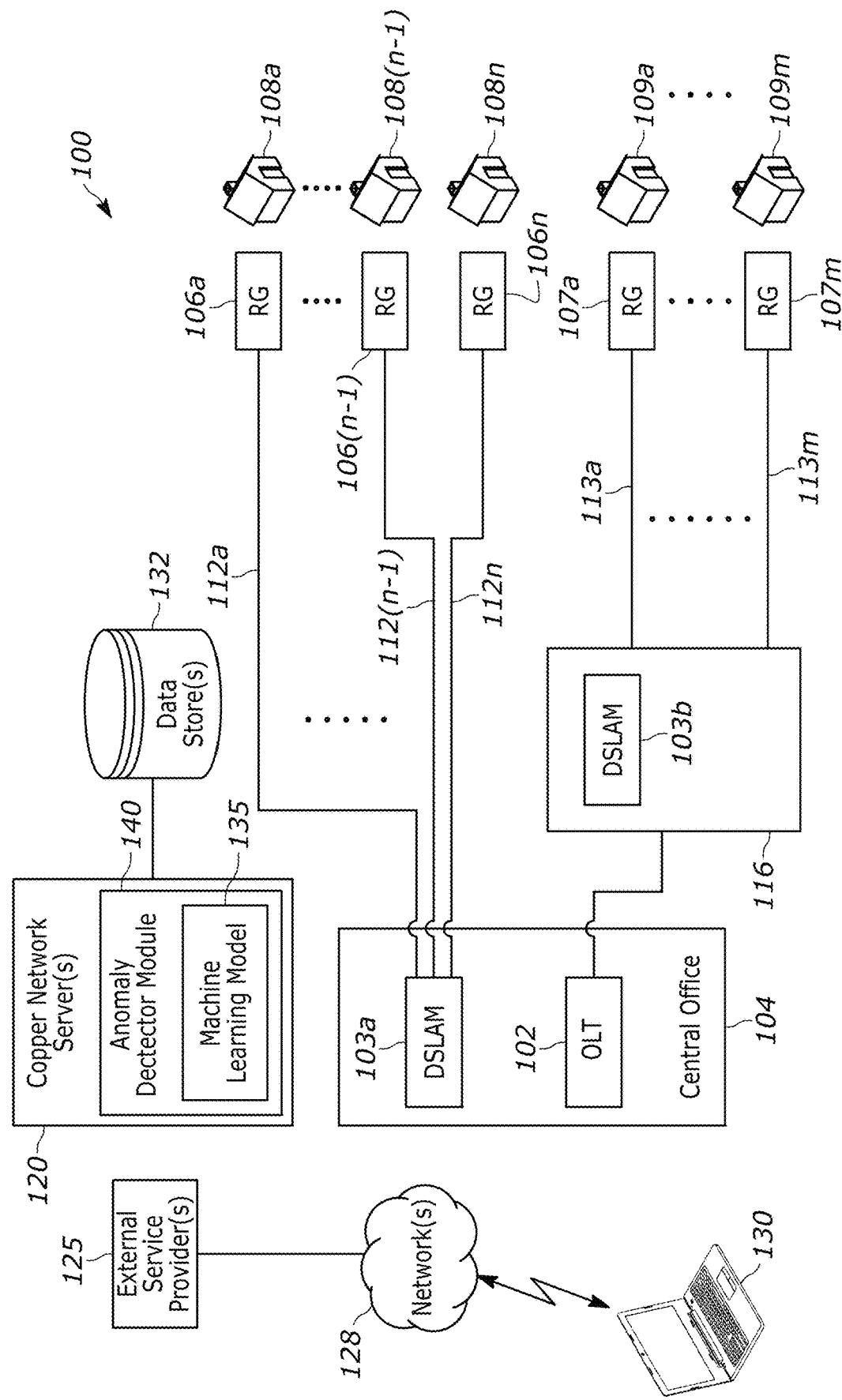
FIG. 1 is a block diagram of an example copper network for and/or in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

As discussed above, customers receiving network services via a copper data and/or communications network may suffer from issues such as service outages or degradations in service, but detecting such issues, let alone identifying the correct source of the issue, may be difficult. For example, typically, a customer contacts a copper network service provider when the customer experiences a service outage or a type of anomalous behavior in service. In response, the service provider typically dispatches a technician to the customer's premises to investigate and resolve the issue. However, the source of the service outage may not be located at the customer's premises; that is, the source of the service outage or anomalous behavior affecting the customer's service may not be located at the residential gateway (RG) device located at the customer's premises. Instead, the source of the service outage may be located at, for example, the digital service line access multiplexer (DSLAM) to which customer's residential gateway and other RGs are connected, the copper cable connecting the customer's residential gateway to the DSLAM, or some other copper network component upstream (e.g., in a direction towards a central office) of the customer's premises. Indeed, when an upstream copper network component is the cause of a service outage or anomaly, the service provider may needlessly dispatch service technicians to the multiple different customer premises which are affected by the same faulty upstream component. Additionally, some service degradation symptoms may occur intermittently and thus may not be detectable by the technician during the technician's visit to the customer's premises.

However, by using the systems, methods, and techniques for anomaly detection described herein, a service provider may be able to automatically and accurately detect an anomaly occurring in a copper network and identify the source of the detected anomaly, e.g., without requiring any technicians to be dispatched. As used herein, the term "anomaly" generally and categorically refers to a fault, an outage, a degradation in service (e.g., past a threshold), or some other abnormal or undesirable event or condition. In embodiments, and as described below, the anomaly detection systems, methods, and techniques may use a trained machine learning model to analyze raw and/or metric data collected from the copper network to identify anomalous behavior and/or a source of the anomalous behavior within a copper network, and may be able to automatically identify an RG, DSLAM, some other copper network component, or a part (e.g., a port, a connector, etc.) of a copper network component as being the source of the anomaly as well as initiate and/or take mitigating actions.

In some situations, customers may not even notify a service provider of service issues because the customers fail to notice any issues or because the customers believe the issues are not severe enough to warrant notifying the service provider. For example, degradation of and/or damage to the copper network may occur so slowly over time such that a customer is unaware of any problems, or the problems are so minor that the customer does not contact the service provider until the degradation and/or damage results in a service outage at the customer premises and/or at premises of other customers. While current monitoring tools may be able to identify discrete issues day-to-day, the current tools often fail to identify long-term issues such as such types of slow degradation over time. In such cases, the anomaly detection system may be able to detect such issues and anomalies in the copper network before their resulting effects escalate in scale, and may automatically initiate and/or take mitigating actions, thereby preventing undesirable effects from occurring.

Thus, the techniques of the present disclosure provide a technical improvement over conventional techniques of copper network anomaly detection at least by improving the speed and accuracy of anomaly detection, the speed and accuracy of source identification of detected anomalies in a copper network, and the speed and accuracy of initiating of mitigating actions. The techniques may detect anomalies, identify sources thereof, and initiate corresponding mitigating actions more efficiently and accurately than is able to be achieved by traditional techniques, while reducing the amount of resources (e.g., technical system and/or network resources, such memory, processing cycles, message traffic, network bandwidth and load, and the like; temporal resources or delays; human resources; etc.) needed to do so as compared to traditional techniques. Indeed, in some implementations, the techniques of the present disclosure may accurately detect an anomaly, identify a specific source of the anomaly, and/or initiate a mitigating action, e.g., automatically, without even requiring any human investigation or input.

Example Copper Network

FIG. 1 is a block diagram of an example copper network 100 in which the systems, methods, and techniques of the present disclosure may be implemented. As illustrated in FIG. 1, the example copper network 100 includes one or more digital subscriber line access multiplexers (DSLAMs) 103a, 103b which may be disposed or located at a central location (e.g., at a central office 104) or at a cabinet 116 outside of the central office 104, respectively. In FIG. 1, the DSLAM 103a is shown as being communicatively connected to one or more residential gateways (RGs) 106a, . . . , 106n located at respective customer premises 108a, . . . , 108n via respective copper transport cables or lines 112a-112n (e.g., digital subscriber lines implemented on copper cables or lines), and thus utilizes a point-to-multipoint topology within the network 100. The residential gateways 106a-106n may be physically located outside and/or inside respective customer premises or locations 108a-108n. As such, a "residential gateway" is interchangeably referred to herein as a "customer premises equipment" (CPE). Each residential gateway or CPE 106a-106n may be, for example, a modem, a router, a switch, a wireless access point, etc. which services its respective location 108a-108n.

In some arrangements, one or more customer premises 109a-109m may be serviced by a portion of the network 100 which includes hybrid transport technologies (e.g., both copper transport technology and some other transport technology). For example, as shown in FIG. 1, the DSLAM 103b is physically located at a cabinet 116 located within a geographic area (e.g., a neighborhood) such that customer premises 109a-109m being serviced by the network 100 via the DSLAM 103b are proximally close to the DSLAM 103b. The RGs or CPEs 107a-107m at the customer premises 109a-109m are communicatively connected to the DSLAM 103b via respective copper lines or cables 113a-113m (e.g., digital subscriber lines implemented on copper cables or lines). The residential gateways or CPEs 107a-107m may be located outside and/or inside respective customer premises or locations 109a-109m, and each residential gateway or CPE 107a-107m may be, for example, a modem, a router, a switch, a wireless access point, etc. servicing its respective location 109a-109m. In the depicted hybrid portion of the network 100, at its upstream end (e.g., in a direction towards the central office 104) the DSLAM 103b may be communicatively connected to an optical line terminal (OLT) 102 disposed at a central location (e.g., at a central office 104), e.g., via transport cable 110. Transport cable 110 may include an optical fiber and/or a copper cable, and appropriate conversion devices (e.g., optical to copper and/or copper to optical, not shown) may be disposed in between (or at) the OLT 102 and/or the cabinet 116 along the transport cable 110.

Of course, in embodiments, the copper network 100 may or may not include additional copper cables to service additional RGs disposed at a plurality of additional customer premises, and may or may not include additional DSLAMs, cabinets, central offices, etc.

As utilized herein, the "components" of the copper network 100 generally refer to the equipment, devices, nodes, and cables of the copper network 100. For example, the components of the copper network 100 shown in FIG. 1 may include the devices DSLAMs 103a and 103b and RGs 106a-106n and 107a-107m, which generally and categorically are referred to herein as "nodes" of the copper network 100. Further, the components of the copper network 100 shown in FIG. 1 may include the copper cables interconnecting the devices or nodes, e.g., the cables 110, 112a-112n, and 113a-113m. Still further, the components of the copper network 100 may include parts, portions, or sub-components of individual components, such as ports, connectors, etc. (e.g., of DSLAMs 103a, 103b and/or RGs 106a-106n, 107a-107m).

Generally speaking, during operations, the copper network 100 supports the delivery of communications and/or data to and from the RGs 106a-106n, 107a-107m for various services such as streaming services, Internet/broadband services, telephony services, IoT (Internet of Things) services, and the like. Some of the services may be provided (e.g., hosted) at one or more servers 120 of the copper network 100, and some of the services may be provided (e.g., hosted) at servers of external service providers 125. The copper network servers 120 and the external service provider servers 125 may be communicatively connected to the central office 104 of the copper network 100 via one or more connecting networks 128, which may include one or more wired and/or wireless private networks and/or public networks such as the Internet, for example.

The copper network 100 may be administrated, maintained, tested, and diagnosed at least partly via the one or more servers 120 of the copper network 100 (e.g., automatically and/or manually via a user interface of the one or more servers 120, not shown). For example, one or more applications (not shown in FIG. 1) may execute at the server(s) 120 and/or the server(s) 120 may host one or more services to provide management, administrative, and/or test functionalities of the copper network 100 (in some cases, automatically or without any in-line user input), and such functionalities may generate and send instructions to one or more components of the copper network 100. Additionally or alternatively, a service technician or agent of the copper network 100 may operate a computing device 130 (e.g., a laptop, a computer, a tablet, a mobile phone, etc.) to manually generate and send instructions to one or more components of the copper network 100, e.g., directly and/or via an application hosted at the servers 120. The computing device 130 may communicatively connect to various copper network components via the networks 128 and the central office 104, and/or the computing device 130 may directly connect to a target copper network component (e.g., via a direct wired or wireless connection) via a service port of the target network component (not depicted in FIG. 1). Irrespective of whether instructions are automatically or manually generated and sent to copper network components, upon receiving the instructions, copper network components may responsively perform the instructed action, e.g., re-configure, update software or firmware, run a test or diagnostic, respond to a test or diagnostic, send data, provide information via a user interface at the copper network components, etc.

Various information and data associated with, utilized by, and/or generated by the copper network 100 may be stored in the data stores 132 of the copper network 100. For example, the copper network components may transmit data via the network 100 and/or via an agent computing device 130 to the servers 120, and the servers 120 may store the received data in data store(s) 132. Examples of stored data may include records of customer contact events with a technical support organization supporting the copper network 100, service call records, records of operating conditions and events which have occurred, measurements, alarms, logbooks, and the like. Further, the data store(s) 132 may store data indicative of configurations, performance, faults, diagnostics, statuses, states, and/or other data corresponding to the components of the system 100. Still further, the data store(s) 132 may store data indicative of the architecture, infrastructure, and component connectivity of the copper network 100, including identifications of various copper network components and indications of which copper network components connect to which other copper network components. Of course, the data store(s) 132 may store any updates to any and all of the information and data stored therein. Generally speaking, the data stores may be implemented using any suitable tangible memories and/or data storage media or mediums, such as data banks, cloud data storage, and the like.

Historical copper network data which is to be saved and/or historized may be transmitted to the servers 120 over the network 128 for storage and historization in data stores 132. Such historical copper network data may include data generated by copper network components (e.g., raw or primary source data) and other data generated based on the data of the components, performance metrics and event occurrences for copper network components, customer records and customer contact events, user interface generated-data, operating condition data, maintenance and test data, configuration data, logbooks, and any other types of data and information generated during and related to the operations of the copper network 100. For example, historical copper network data may include historical data indicative of configurations of the network and of components/equipment of the network, operating behaviors of the network and of components/equipment of the network, and events that have occurred in the network and/or with respect to components/equipment of the network. In some implementations, the historical copper network data may include indications of anomalies (e.g., outages, faults, degradations, etc.) which have occurred within the network and/or within various components/equipment of the network, and sources of the anomalies. In some implementations, the historical copper network data may exclude any indications of anomalies (e.g., outages, faults, degradations, etc.) which have occurred within the network and/or within various components/equipment of the network, and sources of the anomalies.

The historical copper network data may include features, such as measurable properties, characteristics, behaviors, conditions, states or statuses, etc. of and/or included in the historical copper network data. Features of the historical copper network data may include, for example, extracted features (e.g., features which are extracted from the stored data, generally "primary" or "first-order" features) and additional features (e.g., features transformed from the extracted features, such as "secondary" or "second-order" features, "tertiary" or "third-order" features, etc.). Features may be related to one of more copper network components, such as nodes, devices, units, equipment, lines or cables, ports, connectors, and the like. The extracted features and the additional features may be used to train one or more machine learning models 135 of an anomaly detector module 140, where the anomaly detection module 140 may comprise a set of computer-executable instructions stored in memories of the copper network servers 120 and executed by processors of the servers 120. Once trained, the servers 120 may collect (e.g., continuously collect) current data from and related to the copper network 100, and the anomaly detector 140 may use the trained machine learning model(s) 135 in conjunction with the collected current data, features extracted from the collected current data, and/or additional features transformed from the features extracted from the collected current data to detect anomalies in the copper network 100 and identify the sources of the anomalies. In an embodiment, the anomaly detector 140 may operate on current data as it is received at the copper network server(s) 120, e.g., in real-time, to thereby identify anomaly sources and initiate mitigating actions during runtime operations of the network 100. For ease of discussion herein, the ML model 135 is referred to using the singular tense, although it is understood that the ML model 135 may include multiple ML models which cooperatively operate as a single, logical ML model 135.

Generally speaking, by utilizing both extracted features and additional features of copper network data to train the machine learning model 135 utilized by the anomaly detector module 140, the accuracy of anomaly detection by the machine learning model 135 is greatly increased over currently utilized techniques. Advantageously, such increases in the accuracy of anomaly detection provide numerous technical benefits within the copper network 100. For example, more accurate anomaly detection can result in more efficient technical resource usage (e.g., the usage of memory, processing cycles, message traffic, network bandwidth and load, etc.) of the copper network 100 (and/or of various parts thereof). Additionally or alternatively, more accurate anomaly detection provided by the present disclosure can result in decreased downtime of the copper network 100 (and/or various parts thereof) at least because anomalies can be accurately detected and mitigated earlier as compared to using present techniques and, in some situations, may even be prevented from occurring. For example, with the disclosed techniques, the usage of computing, time, and other resources on analyzing false positives of various network components is greatly decreased as compared to that experienced in current systems.

Figure 2:
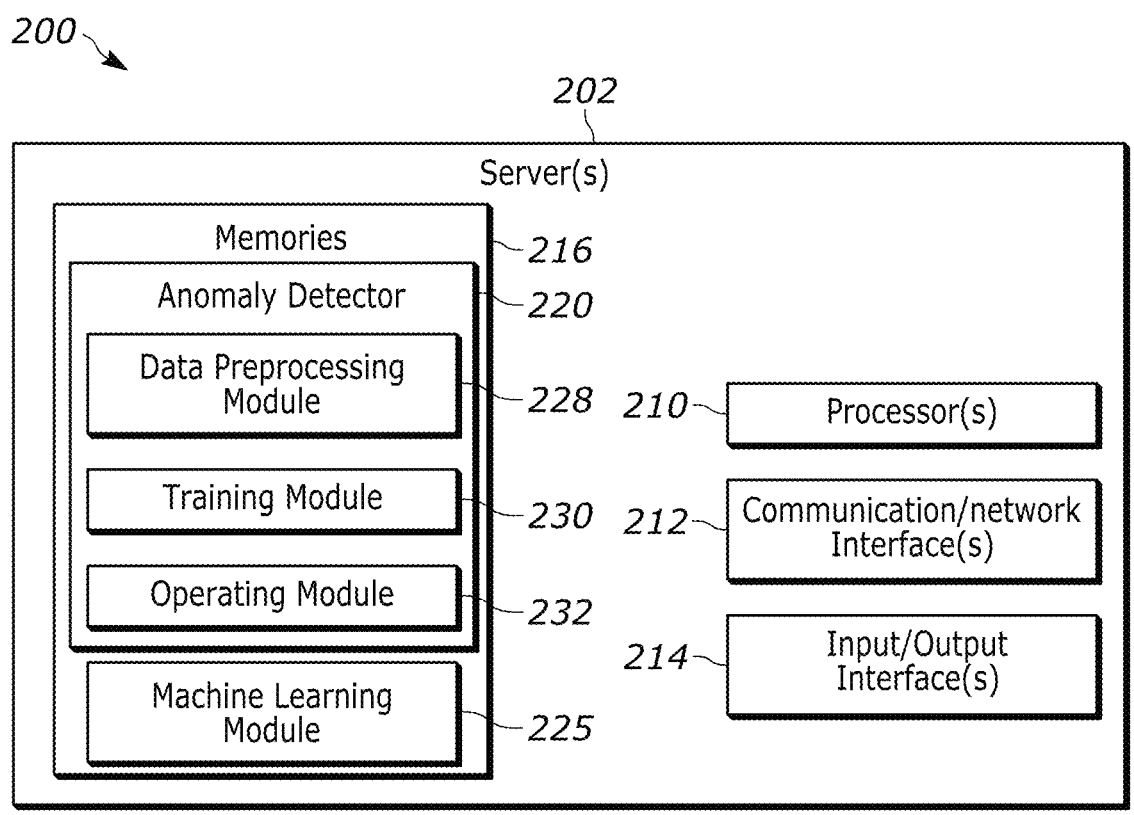
FIG. 2 is a block diagram of an example one or more servers configured to detect sources of anomalies in copper networks in which the methods and/or techniques of the present disclosure may be implemented.

FIG. 2 is a block diagram of one or more example servers 200 that may be used to implement the various systems and methods for detecting and/or identifying a source of an anomaly within a copper network, such as the copper network 100. The server(s) 200 may be included in the server(s) 120 of FIG. 1, for example. For ease of illustration, and not for limitation purposes, the servers 200 are discussed in conjunction with the copper network 100; however, it is understood that the servers 200 may operate in conjunction with copper data and/or communication networks other than the network 100.

As shown in FIG. 2, the server(s) 200 include one or more processors 210, one or more communication or network interfaces 212, one or more input/output (I/O) interfaces 214, and one or more tangible, non-transitory memories 216. The one or more memories 216 may have stored thereon an anomaly detector 220 and one or more machine-learning (ML) models 225. For example, the anomaly detector 220 may be included in the anomaly detection module 140 of FIG. 1, and the ML model 225 may be the ML model 135. In an embodiment, each of the anomaly detector 220 and the ML model 225 may comprise a respective set of computer-executable instructions that are executable by the one or more processors 210 of the servers 200. For ease of discussion herein, the ML model 225 is referred to using the singular tense, although it is understood that the ML model 225 may include multiple ML models which cooperatively operate as a single, logical ML model 225.

The processors 210 of the illustrated example may be implemented using hardware, and may include a semiconductor-based (e.g., silicon-based) device. The processors 210 may include, for example, one or more programmable microprocessors, controllers, digital signal processors (DSP), graphics processing units (GPU) and/or any suitable type of programmable processor capable of executing instructions to, for example, implement operations of the example methods and techniques described herein. Additionally or alternatively, the processors 210 may include a field programmable gate array (FPGA), an application specific integrated circuit (ASIC) etc. that implements operations of the example methods described herein without executing instructions.

The memories 216 may include volatile and/or non-volatile storage media. For example, the memories 216 may include one or more random access memories, one or more read-only memories, one or more cache memories, one or more hard disk drives, one or more solid-state drives, one or more non-volatile memory express, one or more optical drives, one or more universal serial bus flash drives, one or more external hard drives, one or more network-attached storage devices, one or more cloud storage instances, one or more tape drives, etc.

As further shown in FIG. 2, the example server(s) 200 of FIG. 2 include one or more communication or network interfaces 212. The communication interface(s) 212 may enable the servers 200 of FIG. 2 to communicatively connect to and/or communicate with, for example, one or more other devices, one or more networks, one or more databases or data storage entities, one or more systems, etc. For example, the servers 200 may utilize the communication interface(s) 212 to communicate with copper network components (e.g., the DSLAMs 103a and 103b, the RGs 106a . . . 106n and 107a . . . 107m, the computing device 130, etc.) via the copper network 100 and/or the network(s) 128. The example communication interfaces 212 may include any suitable type of communication interface(s) (e.g., wired and/or wireless interfaces) configured to operate in accordance with any suitable communication protocol(s). Example communication interfaces 212 include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

Additionally, the example server(s) 200 of FIG. 2 include the one or more input/output (I/O) interface(s) 214 (e.g., a Bluetooth® interface, a near-field communication (NFC) interface, a universal serial bus (USB) interface, a serial interface, an infrared interface, a PCI express interface, a Wi-Fi transceiver, etc.) to enable the processors 210 to communicate with peripheral I/O devices and/or other communication systems. For example, the I/O interface(s) 214 may be used to control a light source, enable receipt of user input (e.g., from a touch screen, a keyboard, a navigation device such as mouse, touch pad, joystick or trackball, a microphone, a button, etc.) and communication of output data (e.g., visual indicators, instructions, data, images, etc.) to the user (e.g., via a display, a speaker, a printer, a communication interface, an antenna, etc.). The I/O interface(s) 214 may typically include a graphics driver card, graphics driver chip and/or graphics driver processor to drive a display when a display is present. In some cases, at least some I/O interfaces 214 may be included in the communication interfaces 212.

The memories 216 may have stored thereon an anomaly detector (ML) 220 and a machine learning (ML) model 225 utilized by the anomaly detector 220. In an embodiment, the anomaly detector 220 may include one or more sets of computer-executable instructions for implementing methods for identifying one or more sources of one or more anomalies in a copper network. The anomaly detector 220 may be implemented using any suitable computer programming language(s) (e.g., Python, JavaScript, C, C++, Rust, C#, Swift, Java, Go, LISP, Ruby, Fortran, etc.). The anomaly detection module 220 may include one or more submodules, for example, a data preprocessing module 228, a training module 230, and/or an operating module 232 as depicted in FIG. 2.

The data preprocessing module 228 may include instructions for extracting features from historical copper network data generated by the copper network 100 and/or by its components, and transforming at least some of the extracted features into additional features to create additional training data. For example, the data preprocessing module 228 may extract primary features from the historical copper network data stored in the data store 132, and/or as copper network data is received from the network 100 (e.g., for historization).

In an embodiment, the data preprocessing module 228 may segment or portion the historical copper network data into sets of time-series data of a specified or pre-determined time interval (e.g., 5 minutes, 15 minutes, 1 hour, 24 hours, etc.), and the data preprocessing module 22 may extract one or more primary features from each set of portioned time-series data. In some implementations, the data preprocessing module 228 may select or determine the particular primary features which are to be extracted from the sets of portioned time-series data. The data preprocessing module 228 may select or determine the primary features which are to be extracted based on, for example, types of components or equipment, sources of the historical data (e.g., equipment/components, technician records, customer service records, maintenance and/or diagnostic logs, etc.), domain knowledge, time-series heuristics, user input, and the like. For example, the data preprocessing module 228 may determine to extract primary features (such as link retrains, noise margins, etc.) from historical data generated by DSLAMs and RGs to thereby capture relationships between RGs and possible upstream issues.

In an example, primary features may be extracted from data that is directly generated by and/or directly related to specific sources, such as the components of the copper network 100 (e.g., a specific DSLAM 103; a specific RG 106, 107; a specific link 110, 112, 113; etc.), specific parts, portions, or sub-components of a specific component (e.g., a specific port of a specific DSLAM 103, a specific port of a specific RG 106, 107, a specific connector attached to a specific link 110, 112, 113 or port, etc.), and/or combinations of components and/or sub-components of the copper network 100. Such primary features may include, for example, link retrains, errored seconds, severely-errored seconds, noise margin (for downstream and/or upstream data), attenuation (e.g., up and/or down), and/or weather patterns (e.g., average precipitation, humidity, ambient temperature, etc., as measured by sensors associated with the copper network 100), and/or other types of data that are indicative of behaviors and/or states related to the components of the copper network 100. A "link retrain," as utilized herein, generally refers to a disconnect and a reconnect of a network component, such as the disconnect and reconnect of an RG or DSLAM. As such, the terms "link retrain" and "disconnect/reconnect" are utilized interchangeably herein. An "errored second," as utilized herein, generally refers to a time interval of a second during which any error (e.g., loss of signal, an encoding violation, etc.) within the copper network 100 has occurred. A "severely-errored second," as utilized herein, generally refers to an errored second in which a ratio of errors to the total bits transmitted during the one-second interval exceeds a predefined threshold. A "noise margin," as utilized herein, generally refers to a ratio between a signal strength of an electrical signal and noise on the copper line; the noise margins measured for the downstream (e.g., towards the RGs 106, 107) and upstream (e.g., towards the central office 104) directions may differ. "Attenuation," as utilized herein, generally refers to an amount of signal loss as a signal travels down a copper line; the attenuation measured for the downstream and upstream directions may differ, and may include respective increases or a decreases in attenuation. Of course, other types of data that are indicative of behaviors and/or states related to the components of the copper network 100 may be extracted from the historical copper network data stored in the data store 132 to thereby obtain extracted features. The extracted features may be stored in the data store 132, for example.

In addition to extracting features from the historical copper network data, the data preprocessing module 228 may also transform at least some of the extracted features (e.g., transform at least some of the extracted primary features) to generate additional features (e.g., secondary features, tertiary features, etc.). Said another way, an "additional" feature, as utilized herein, may be viewed as a transformed, extracted feature. Generally speaking, an additional feature may be a feature that is indicative of a characteristic of at least one extracted primary feature in a broader sense, e.g., over time, in combination with other extracted primary features, across a group of components, in combination with other characteristics, etc. As such, a transformation of an extracted primary feature to generate an additional feature may include transforming multiple data points, at least some of which are data points of the extracted primary feature. For example, a transformation may be based on data points of the extracted primary feature over time, data points of the extracted primary feature in combination with data points of other extracted primary features, data points of the extracted primary feature across a group of components, and/or of other combinations. The additional features may pertain to specific individual nodes components, or sub-components of the network 100, to specific groups of nodes, components, and/or sub-components of the network 100, and/or to different time intervals (e.g., time-series features), for example. Further, in some situations, one or more different types of transformations may be applied to one or more of the extracted features to generate the additional features. For example, combinations of transformations, nested transformations (e.g., a transformation of an additional feature which was generated based on a previous transformation), etc. may be utilized to generate further additional features.

In an example, transforming the extracted features may include performing one or more statistical aggregation techniques (e.g., calculating means, medians, maximums, minimums, standard deviations, etc.) on the extracted features and/or on combinations of extracted features, where the outputs of the statistical aggregation techniques may be included in the additional features. For example, the extracted features may be transformed by using statistical aggregation techniques so that each transformed, extracted feature represents a respective RG (or other component or sub-component of the copper network 100) over a particular time interval, such over 24 hours or per day, e.g., a "per-RG, per-day" additional feature. The features determined based on statistical aggregation may be included as additional features corresponding to the copper network 100, for example, and may be stored in the data store 132.

Additionally or alternatively, transforming the extracted features may include determining, generating, or calculating an aggregate feature of a component of the network 100 based on its sub-components and/or based on other components to which the subject component is connected. In an embodiment, an aggregate feature of a component may be obtained by totaling or performing one or more calculations on the values of extracted features of its sub-components of the subject component. For example, an aggregate feature of a DSLAM 130a may be based on values of extracted features at ports of the DSLAM 103a and/or values of extracted features at RGs 108a-108n connected to the DSLAM 103a, and may include a total summation, an average, etc. For example, an aggregate feature of an FDH 116 may be based on values of extracted features of the DSLAM 103a and of other DSLAMs included in the FDH 116 (not depicted in FIG. 1), and may include a total summation, an average, etc. The features determined based on aggregation across sub-components and/or connected other components of a subject component may be included as additional features corresponding to the copper network 100, for example, and may be stored in the data store 132.

Still further additionally or alternatively, transforming the extracted features may include determining or calculating a leave-one-out average. Generally speaking, a leave-one-out average may determine an average of an extracted feature of a component based on all but one of its sub-components or components connected thereto. That is, a particular sub-component or a particular other component connected to a subject component is left out or not considered in determining a leave-one-out average of an extracted feature of the subject component. For example, for DSLAM 103b connected to RGs 107a-107m via links 113a-113m, a leave-one-out average of link retrains associated with the DLSAM 103b may include a first link retrain leave-one-out average calculated from retrains of links 113b-113(m−1), thus "leaving out" retrains of link 113a; a second link retrain leave-one-out average calculated from retrains of links 113a and 113c-113m, thus "leaving out" retrains of link 113b; and so on. Similar leave-one-out averages may be determined based on the multiple DSLAMs included in and/or communicatively connected to a central office 104, for example. An overall leave-one-out average of the component may be determined based on the respective leave-one-out averages related to the component's sub-components and/or connected components. For example, the overall leave-one-out average of the DSLAM 103b may be determined by averaging the respective leave-one-out averages corresponding to the each of the links 113b-113m connected to the DSLAM 103b. The respective and/or overall leave-one-out average (s) of a component may be included as additional features corresponding to the copper network 100, for example, and may be stored in the data store 132.

Further, in some embodiments, transforming the extracted features may include discovering or identifying additional features which occur over time (and in some cases, also over multiple components and/or subcomponents), which are generally and categorically referred to herein as "lagged" features. An example of a lagged feature may be an anomaly which occurs at a downstream component after some time interval after an upstream component was subject to a manual technician procedure. Other examples of lagged features may include a drift-over-time (e.g., a long-term, gradual change over time) of an extracted feature of a subject component, a subject sub-component, or groups of components and/or of sub-components of the copper network 100, such as a drift-over-time of a noise margin, of attenuation, and/or of another primary feature of one or more components. In some cases, an additional feature (e.g., a transformation of an extracted primary feature) may itself be transformed in a time-series manner, so the values of the additional feature are respective time-series data points of the another additional feature. In an example, the per-RG, per-day additional feature mentioned above may itself be transformed in a time-series manner, e.g., a per-week, per-two-weeks. In an example, the leave-one-out average of a DSLAM mentioned above may itself be transformed in a time-series manner, e.g., per-day, per-week, per-month, etc. to generate a new additional feature (e.g., an additional feature generated from multiple, nested transformations). Such lagged features which occur over time (some of which may be transformations of extracted features, and/or some of which may be transformations of additional features) may be included in the additional features corresponding to the copper network 100, for example, and may be stored in the data store 132.

Of course, the data preprocessing module 228 may apply other additional and/or alternate types of transformations to one or more extracted features to thereby generate one or more additional features. The extracted features and additional features may be stored in the data store 132, and the stored extracted features and additional features may be utilized as training data for a machine-learning model utilized by the operating module 232 of the anomaly detector 220. In some embodiments, the training data may also include at least some of the (raw) historical copper network data, and in some embodiments, the training data may exclude some or all of the (raw) historical copper network data.

In an embodiment, the data preprocessing module 228 may select or determine the set of transformations (from among a plurality of possible transformations) that are to be performed on the extracted features. The selection or determination of the particular transformation(s) may be based on, for example, types of components or equipment associated with the extracted features, sources of the historical data corresponding to the extracted features (e.g., equipment, technician records, customer service records, maintenance and/or diagnostic logs, etc.), domain knowledge, time-series heuristics, user input, etc. For example, the data pre-processing module 228 may determine to perform a time-series transformation (e.g., to identify lagged features) on the extracted features so that the machine-learning model may be trained on past network behavior related to current data. In another example, RG extracted features may be aggregated per DSLAM, and/or DSLAM port extracted features maybe aggregated per DSLAM.

As previously discussed, the extracted features and the additional features transformed from the extracted features may be stored in the data store 132 and utilized as a training data set for the machine learning model utilized by the anomaly detector 220. In some implementations, the data preprocessing module 228 may include computer-executable instructions for reducing the number of variables in the training data set while preserving information and characteristics of the training data set (e.g., dimensionality reduction). Advantageously, dimensionality reduction can accelerate training time for the machine learning model while maintaining characteristics of the extracted and additional features. For example, principal component analysis (PCA) may be utilized on the extracted and additional feature data stored in the data store 132 to reduce the dimensions of the training data set, e.g., by linearly mapping the training data set to a lower-dimension space.

Turning now to the training module 230, the training module 230 may include computer-executable instructions for training the machine learning model 225 on (e.g., by utilizing) both the extracted feature data and the additional features data, and optionally other historical copper network data (e.g., operating data, measurement data, sensed data, event data, configurations, states, asset management data, customer service data, technician and system logs, etc., and such as described elsewhere herein), as the training data set. The historical data may be generated by and/or related to components of the copper network, sub-components of the copper network components, combinations of the copper network components, and/or the copper network itself.

In an embodiment, the training data set may include, within the historical copper network data, indications of anomalies that have occurred and sources of the historical anomalies. In this embodiment, the ML model 225 may be trained, e.g., in a supervised manner, to discover one or more historical features of the copper network (which may include extracted features and/or additional features) having respective strengths of associations with one or more historical anomalies and/or sources of the historical anomalies, of the copper network, that are greater than respective strengths of associations of other historical features of the copper network with the one or more historical anomalies and/or sources of the historical anomalies, for example.

In another embodiment, the training data set may or may not include, within the historical copper network data, indications of anomalies that have occurred and sources of the historical anomalies. In this other embodiment, the ML model 225 may be trained, e.g., in an unsupervised manner, to discover or learn typical, prevailing, or normal operating behaviors and/or features of the copper network and/or of components of the copper network. Such typical, prevailing, or normal operating behaviors may be determined by clustering or other similar data discovery techniques, for example. In some implementations, such typical, prevailing, or normal operating behaviors or features may be indicative of or may be present when the copper network and/or its components are operating within a desired or target range (e.g., as defined by a set of boundaries, which may be at least partially pre-defined and/or may be at least partially discovered or learned based on clusters or groupings in the historical copper network data). In this embodiment, the ML model 225 may be utilized, e.g., on current data, to detect anomalies within the copper network and/or copper network components, e.g., to detect copper network and/or copper network component behavior that is outside of the range or set of discovered typical or normal operating behaviors. For example, the ML model 225 may detect features, of the current data, that are greater than a distance away from the set of features indicative of typical or normal operating behaviors. The distance may be discovered via the application of the model to the current copper network data, and/or the distance may be associated with an adjustable threshold. The threshold may be adjusted, for example, to tune a sensitivity of the detection of anomalies. In another example, the ML model 225 may determine or calculate a total number of times that data is or is needed to be split or partitioned to isolate an anomaly. Of course, other implementations of utilizing the ML model 225 on current data to detect anomalies within the copper network and/or the copper network components may be possible.

The training module 230 may utilize one or more suitable machine learning algorithms to train the model 225 such as, for example, linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines, which may be directed toward one or more categorizations of machine learning, including supervised learning, unsupervised learning, and reinforcement learning. In an embodiment, the training module 230 may utilize an isolation forest algorithm in an unsupervised manner to train the model 225 using the training data set, where the training data set includes both the extracted features and the additional features. The training module 230 may train the ML model 225 to identify anomalous data points (e.g., corresponding to values of features, whether extracted or additional) and respective confidence scores indicative of a probability or likelihood that the equipment, component, or source associated with each identified data point is indeed anomalous. For example, the model 225 may be trained to identify a copper network component which has a greater strength of association with service outages and/or degradations than other copper network components, and/or to identify a copper network component which is otherwise performing abnormally when compared to the performance of other components.

In an embodiment, the training module 230 may include computer-executable instructions for evaluating or validating the trained model 225 by using validation data (which typically is a data set other than the training data set). For example, an ML model 225 which has been trained by using supervised techniques may be evaluated or validated based on a validation data set.

In an embodiment, the training module 230 may validate the trained model 225 based on excess mass curves, where the excess mass curves may be indicative of the accuracy of the trained model 225 in its ability to detect anomalies of the copper network 100. For example, an ML model 225 which has been trained by using unsupervised techniques may be evaluated or validated based on excess mass curves of the model 225. To illustrate, in one-dimensional space, determination of a datapoint as anomalous typically relies on how far the datapoint is from a central measure such as the mean or the median. In a multivariate setting, a scoring function may be used to determine which datapoints are normal and which are anomalous. In an embodiment, such a scoring function may be applied to the excess mass curves of the trained model 225, and the result or score generated by the scoring function (e.g., which is generally referred to herein as an "excess mass curve score") may be indicative of a (relative) accuracy of the trained model 225. Subsequently, the trained model 225 may be adjusted and the scoring function may be applied to the excess mass curves of the adjusted, trained model 225 to obtain an adjusted result or excess mass curve score. These cycles of adjustments and corresponding measurements of the relative accuracy of the adjusted, trained model (via the scoring function) may be repeated until a result or score generated by the scoring function as applied to the n-times adjusted model is optimized, e.g., until the excess mass curve score is either at a maximum or minimum, depending on the paradigm used to represent the data points. For instance, the data points to which the scoring function is applied may be represented by using negative values or by using positive values.

For example, to validate the model 225 for accuracy, the training module 230 may determine a set of excess mass curves of the initially-trained model 225. The training module 230 may apply a scoring function to the set of excess mass curves (which is a multivariate setting), where a result or score generated by the scoring function may be indicative of which datapoints of the set of excess mass curves are normal and which datapoints of the set of excess mass curves are anomalous. Based on the resulting score generated from the application of the scoring function to the excess mass curves of the initially-trained model 225, the training module 230 may select and adjust values of one or more hyperparameters corresponding to the training of the model, re-train the model 225 based on selected, adjusted hyperparameters, determine the set of excess mass curves of the re-trained model 225, and apply the scoring function to the set of excess mass curves of the re-trained model 225 to generated an updated excess mass curve score. This cycle may be repeatedly performed until the resulting score is optimized (e.g., at a minimum or a maximum), that is, until the hyperparameters are maximally optimized, thereby indicating that the model 225 has been optimally adjusted and/or tuned.

Generally speaking, hyperparameters may be external variables or attributes associated with the training of the model which are indicative of external training configuration conditions bounding or limiting the training. For example, when the training utilizes an isolation forest training algorithm, hyperparameters may include size of the training data set, a number of trees, a number of branches, a tree depth, a sample size, etc. The training module 230 may, in embodiments, adjust one or more hyperparameters associated with the training algorithm (e.g., in the cyclical manner described above) to optimize results or scores of the scoring function as applied to excess mass curves of each adjustment and re-training of the model 225, and thereby improve (and in some cases optimize) the accuracy of the trained machine learning model 225 in a measurable manner. Said another way, the training module 230 may tune (and in some cases, optimally tune) the machine learning model 225 based on the selection and adjustment of one or more hyperparameters associated with the training of the ML model 225 by using excess mass curves to measure the accuracy or and/or validate the model 225.

The trained machine learning model 225 (which may be an optimally trained or tuned machine learning model 225) may be stored in the memories 216 for use by the operating module 232 of the anomaly detector 220, for example.

Turning now to the operating module 232, the operating module 232 may utilize the stored machine learning model 225 to detect anomalies in the copper network 100. For example, the operating module 232 may detect anomalies within the copper network 100 and sources thereof based on current data of copper network 200. For example, the operating module 232 may obtain current data received at the one or more servers 202 from components of the copper network 100 and other data sources as such current data is provided to the servers 202 for historization. The current data may include, for example, data generated by copper network components (e.g., raw or primary source data) during operations, data indicative of current configurations of the network and of components/equipment of the network, data indicative of current operating behaviors, performance metrics, and event occurrences of the network and of components/equipment of the network, updates to customer records and customer contact events, current user interface generated-data, current operating condition data, current maintenance and test data, updates to logbooks, and any other types of data and information being generated during and related to the operations of the copper network 100. The operating module 232 may input the obtained current data into the stored ML model 225 to thereby obtain, at outputs of the ML model 225, an indication of detected anomalies and optionally respective sources of the anomalies. In some implementations, for each identified source of anomalies, the ML model 225 may also provide, at its output, one or more of: a respective likelihood that a detected anomaly is an actual anomaly, a respective likelihood that an identified source is indeed a source of anomalies, a respective likelihood that an identified source is indeed a source of a particular anomaly, and/or the like. In some implementations, the ML model 225 may provide, at its output, a ranking of respective likelihoods of the detected one or more sources being actual sources of the one or more anomalies.

Based on the output of the ML model 225, the operating module 232 may initiate an action to mitigate the undesirable effects of the anomaly and its source within the copper network 100. For example, when a particular copper network equipment is identified by the ML model 225 to be a source of an anomaly, the mitigating action may include changing one or more settings of the particular copper network equipment, and/or executing a diagnostic or test corresponding to the particular copper network equipment. For example, when a DSLAM is identified by the ML model 225 to be a source of an anomaly, the mitigating action may include re-routing a communication signal through a DSLAM other than the DSLAM is identified by the ML model 225 as being an anomaly source. In some situations, the mitigating action may include transmitting an instruction to another application executing within and/or in concert with the copper network (e.g., a diagnostic application, a routing application, a configuration application, a resource-throttling application, a technician dispatch application, etc.) to initiate the mitigating action for the identified anomaly source.

Example Method for Detecting Sources of Anomalies in a Copper Network

Figure 3:
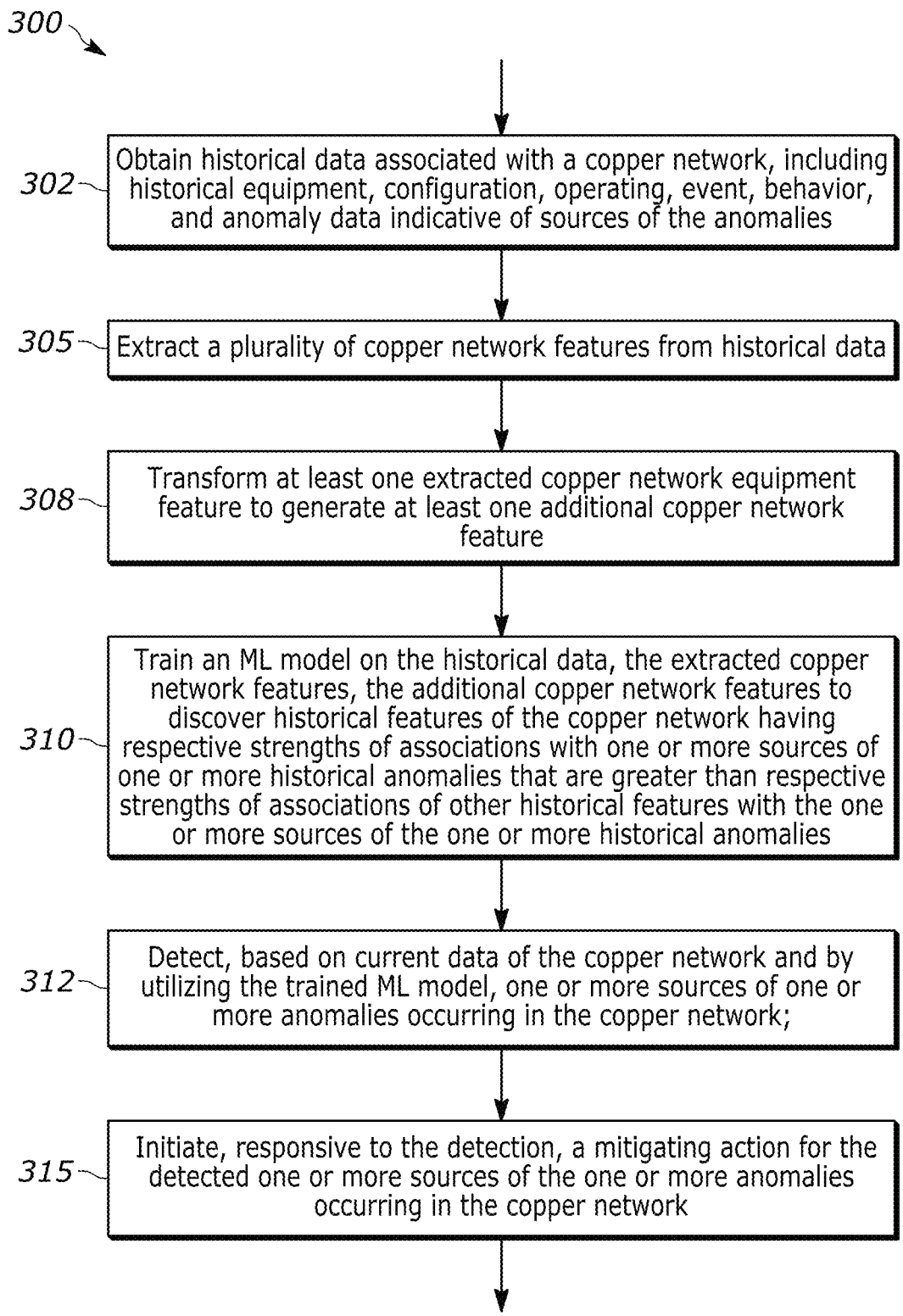
FIG. 3 depicts a flow diagram of an example method for detecting sources of anomalies occurring in a copper network.

FIG. 3 is a flow diagram of an example method 300 for detecting sources of anomalies in a copper network, such as the copper network 100 of FIG. 1. For example, instances of the method may be executed at the copper network server(s) 120 of FIG. 1 or at the server(s) 202 of FIG. 2. In an example implementation, the anomaly detection module 140 stored on one or more non-transitory memories of the server(s) 120 may be executable by one or more processors of the server(s) 120 to cause the server(s) 120 to perform at least a portion of embodiments of the method 300. In an example implementation, the anomaly detector 220 stored on the one or more non-transitory memories 216 of the server(s) 202 may be executable by the one or more processors 210 of the server(s) 202 to cause the server(s) 202 to perform at least a portion of embodiments of the method 300. For ease of illustration, and not for limitation purposes, the method 300 is described with simultaneous reference to FIGS. 1 and 2. Further, in embodiments, the method 300 may include additional and/or alternate steps or actions, if desired.

At a block 302, the method 300 may include obtaining historical data associated with a copper network. For example, one or more processors of the servers 120 may obtain historical data corresponding to the copper network 100 from the data store 132 and, in some cases, also may receive current copper network data from the copper network 100 as it is being sent to the servers 120 to be historized. The obtained historical data may include data indicative of a multiplicity of historical copper network equipments included in the network 100. As previously discussed, the copper network 100 may include a plurality of copper network equipments, where the plurality of copper network equipments may include multiple CPEs disposed at multiple customer locations as well as multiple DSLAMs, each of which may be communicatively connected to a respective set of CPEs. The obtained historical data may include data indicative of a multiplicity of historical operating behaviors of the copper network 100 which have occurred, a multiplicity of historical events corresponding to the copper network 100 which have occurred, and a multiplicity of historical anomalies which have occurred in the copper network 100, sources of the historical anomalies, as well as other types of historical data. For example, the historical data may include data indicative of failures, service degradations, service and maintenance operations which have been performed and data associated therewith, operating data, network and component configurations, customer contact and/or service records, asset management records, etc.

At a block 305, the method 300 may include extracting a plurality of copper network equipment features from the obtained historical data, where each copper network equipment feature may be indicative of a behavior and/or a state of a respective copper network equipment, component, or sub-component. In some cases, an extracted feature may correspond to or include data generated by the respective copper network equipment, component, or sub-component. The extracting 305 of the plurality of copper network equipment features may be performed in manners similar to the feature extraction performed by the data preprocessing module 228 described above, in an embodiment. For example, extracted copper network equipment features may include link retrains, errored seconds, noise margins, and/or attenuation of various copper network components and/or their sub-components.

At a block 308, the method 300 may include transforming at least one extracted copper network equipment feature, thereby generating at least one additional copper network equipment feature. For example, transforming the at least one extracted copper network equipment feature may be performed using one or more of the transformation techniques described with respect to the data preprocessing module 228 and/or elsewhere within this document. For instance, additional copper network equipment features may include a statistically-aggregated feature, a feature based on an aggregation across sub-components and/or other connected components, a lagged feature, a leave-one-out average, and/or other features related to various copper network components, combinations or groups of copper network components, sub-components of copper network components, combinations or groups of copper network components, and/or the like.

At a block 310, the method 300 may include training a machine learning (ML) model on the historical data, the extracted plurality of copper network equipment features, and the at least one additional copper network equipment feature to discover one or more historical features of the copper network having respective strengths of associations with one or more historical anomalies, of the copper network, and/or sources of the historical anomalies that are greater than respective strengths of associations of other historical features of the copper network with the one or more historical anomalies and/or sources of the historical anomalies.

The training 310 of the ML model may include utilizing supervised learning techniques, in an embodiment. For example, the training 308 of the ML model may be performed in a manner similar to that described with respect to the training module 230 and/or as described elsewhere within this document.

In an embodiment (not shown), the method 300 may include validating a trained ML model (e.g., based on a validation data set which is different than the data set utilized to train the model, or by utilizing excess mass curves), and tuning one or more hyperparameters of the ML model based on the validation. For example, validating the trained ML model may include determining one or more excess mass curves of the trained ML model, where the excess mass curves may be generally indicative of an accuracy of the ML model itself, e.g., in a manner such as described elsewhere herein. Accordingly, the method 300 may include determining excess mass curves of the trained ML model, applying a scoring function to the excess mass curves, adjusting one or more hyperparameters based on the score resulting from the excess mass curves, and re-training the ML model based on the adjusted hyperparameters to generate a re-trained ML model. The re-trained ML model may be validated, respective excess mass curves may be determined therefrom, and one or more of the hyperparameters may be again adjusted based on the score generated by applying the scoring function to the determined respective excess mass curves. This cycle may be repeated until the excess mass curve score resulting from a most recent validation of a multiply re-trained ML model is optimized (e.g., falls below a predetermined threshold, is minimized, or is reduced to zero for a first paradigm of data representation, or alternatively increases above a predetermined threshold or is maximized for a second paradigm of data representation). Said another way, this cycle may be repeated until the hyperparameters of the training of the ML model have been tuned. At this point, the most recently validated ML model has been optimized for accuracy and may be stored and utilized by the anomaly detector module 140 for detecting anomalies within the current copper network system 100 and corresponding sources of the detected anomalies.

At a block 312, the method 300 may include detecting, by the one or more processors based on current data of the copper network and by utilizing the trained ML model, one or more sources of one or more anomalies occurring in the copper network. For example, the method 300 may include detecting 312 that a particular copper network equipment (e.g., a particular CPE or a particular DSLAM) is a source of at least one of the one or more anomalies within the copper network 100, detecting that a particular service operation which has been performed with respect to one or more copper network equipments is a source of at least one of the anomalies, detecting that a particular segment of a cable or line is a source of one or more of the anomalies, etc. Generally speaking, the block 312 may include providing the current data generated by the copper network 100 as inputs into the trained ML model 135, the trained ML model 135 may execute on the provided inputs to detect one or more anomalies within the copper network 100 and respective sources thereof. The trained ML model 135 may generate one or more outputs indicative of the detected anomalies and/or the respective sources thereof, for example. In some implementations, for each identified source of anomalies, the trained ML model 135 may also provide, at its output, one or more of: a respective likelihood that a detected anomaly is an actual anomaly, a respective likelihood that an identified source is indeed a source of anomalies, a respective likelihood that an identified source is indeed a source of a particular anomaly, and/or the like. In some implementations, the trained ML model 135 may provide, at its output, a ranking of respective likelihoods of the detected one or more sources being actual sources of the one or more anomalies.

At a block 315, the method 300 may include initiating, responsive to the detecting, a mitigating action for the detected one or more sources of the one or more anomalies occurring in the copper network. For example, when a particular copper network equipment is detected 312 to be a source of anomalies, the initiating 315 of the mitigating action may include transmitting, to the particular copper network equipment, an instruction to change one or more settings of the particular copper network equipment, and/or may include causing a diagnostic or test corresponding to the particular copper network equipment to be executed. For example, when a detected source of the one or more anomalies is a DSLAM, the initiating 315 of the mitigating action may include initiating a re-routing, within the network 100, of a communication signal through a DSLAM other than the DSLAM which has been detected to be an anomaly source. In some implementations, the initiating 315 of the mitigating action may include transmitting an instruction to another application executing within and/or in concert with the copper network (e.g., a diagnostic application, a routing application, a configuration application, a resource-throttling application, etc.) to initiate the mitigating action.

In some embodiments (not shown), the method 300 may include transmitting an indication of the detected one or more sources of the one or more anomalies to a user interface, an application, or another computing device. For example, the method 300 may include, based on the detected one or more sources, transmitting an instruction or command to an application executing within the copper network 100 to initiate or take the mitigating action, such as re-routing traffic within the network, executing a diagnostic or a test, changing a setting and/or boundary condition, etc. Additionally or alternatively, in these embodiments, the method 300 may include transmitting an indication of the detected one or more sources to a user interface, such as a remote user interface 130 or a user interface of a computing device which has a direct wired and/or wireless connection with some component of the copper network (e.g., at the DSLAM 103, at an RG 106, etc.

In some embodiments (not shown), the method 300 may include augmenting the historical data with the current data prior to the extracting 305 of copper network features. In these embodiments, the extracting 302 of the copper network features may be from the augmented historical data, and the at least one additional copper network feature generated from the transforming 308 of the copper network features extracted from the augmented historical data may include at least one lagged or time-based feature. In these embodiments, the training 310 of the ML model may be based on the augmented historical data, the plurality of features extracted from the augmented historical data, and the additional features generated from transforming at least one feature included in the plurality of features extracted from the augmented historical data (in which the additional lagged or time-based feature is included).

In some embodiments (not shown), the method 300 may include updating the historical data to include information generated from executing a first instance of the method 300. For example, an indication of the extracted plurality of copper network equipment features, the at least one additional copper network equipment feature, the current data of the copper network, the one or more anomalies, and the one or more sources may be historized as additional (or newly generated) historical data in the data stores 132. In these embodiments, the method 300 may also include extracting a second plurality of copper network equipment features from the updated historical data, transforming one or more features included in the second plurality of copper network equipment features to generate one or more additional copper network equipment features, retraining the machine learning model on the second extracted plurality of copper network equipment features, the one or more additional copper network equipment features, and updated current data of the copper network, and detecting, by utilizing the re-trained machine learning model, at least one source of at least one anomaly in the copper network. As such, in this manner, subsequent anomaly and source detection may be performed (e.g., during subsequent executions of the method 300) using the most current training data indicative of historical copper network system 100 behavior, and therefore may further increase accuracy and speed of anomaly detection and source identification while further reducing the system resources needed to do so.

Example Method for Detecting Anomalies in a Copper Network

Figure 4:
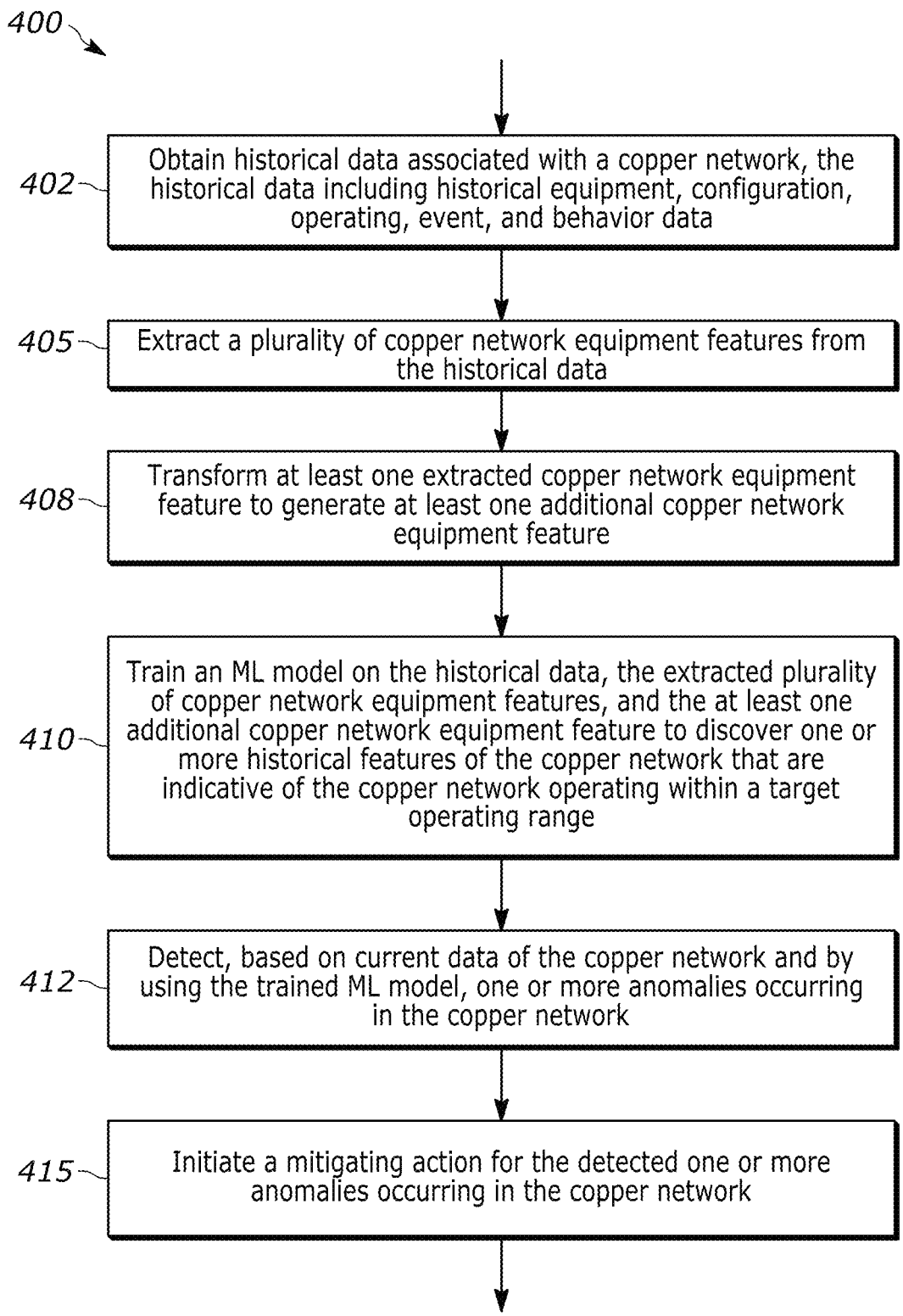
FIG. 4 depicts a flow diagram of an example method for detecting anomalies occurring in a copper network.

FIG. 4 is a flow diagram of an example method 400 for detecting anomalies in a copper network, such as the copper network 100 of FIG. 1. For example, instances of the method may be executed at the copper network server(s) 120 of FIG. 1 or at the server(s) 202 of FIG. 2. In an example implementation, the anomaly detection module 140 stored on one or more non-transitory memories of the server(s) 120 may be executable by one or more processors of the server(s) 120 to cause the server(s) 120 to perform at least a portion of embodiments of the method 400. In an example implementation, the anomaly detector 220 stored on the one or more non-transitory memories 216 of the server(s) 202 may be executable by the one or more processors 210 of the server(s) 202 to cause the server(s) 202 to perform at least a portion of embodiments of the method 400. For ease of illustration, and not for limitation purposes, the method 400 is described with simultaneous reference to FIGS. 1 and 2. Further, in embodiments, the method 400 may include additional and/or alternate steps or actions, if desired.

At a block 402, the method 400 may include obtaining historical data associated with a copper network. For example, one or more processors of the servers 120 may obtain historical data corresponding to the copper network 100 from the data store 132 and, in some cases, also may receive current copper network data from the copper network 100 as it is being sent to the servers 120 to be historized. The obtained historical data may include data indicative of a multiplicity of historical copper network equipments included in the network 100. As previously discussed, the copper network 100 may include a plurality of copper network equipments, where the plurality of copper network equipments may include multiple CPEs disposed at multiple customer locations as well as multiple DSLAMs, each of which may be communicatively connected to a respective set of CPEs. The obtained historical data may include data indicative of a multiplicity of historical operating behaviors of the copper network 100 which have occurred and a multiplicity of historical events corresponding to the copper network 100 which have occurred. The obtained historical data may or may not include data indicative of a multiplicity of historical anomalies which have occurred in the copper network 100, sources of the historical anomalies, as well as other types of historical data. For example, the historical data may include data indicative of failures, service degradations, service and maintenance operations which have been performed and data associated therewith, operating data, network and component configurations, customer contact and/or service records, asset management records, etc.

At a block 405, the method 400 may include extracting a plurality of copper network equipment features from the obtained historical data, where each copper network equipment feature may be indicative of a behavior and/or a state of a respective copper network equipment, component, or sub-component. In some cases, an extracted feature may correspond to or include data generated by the respective copper network equipment, component, or sub-component. The extracting 405 of the plurality of copper network equipment features may be performed in manners similar to the feature extraction performed by the data preprocessing module 228 described above, in an embodiment. For example, extracted copper network equipment features may include link retrains, errored seconds, noise margins, and/or attenuation of various copper network components and/or their sub-components.

At a block 408, the method 400 may include transforming at least one extracted copper network equipment feature, thereby generating at least one additional copper network equipment feature. For example, transforming the at least one extracted copper network equipment feature may be performed using one or more of the transformation techniques described with respect to the data preprocessing module 228 and/or elsewhere within this document. For instance, additional copper network equipment features may include a statistically-aggregated feature, a feature based on an aggregation across sub-components and/or other connected components, a lagged feature, a leave-one-out average, and/or other features related to various copper network components, combinations or groups of copper network components, sub-components of copper network components, combinations or groups of copper network components, and/or the like.

At a block 410, the method 400 may include training a machine learning (ML) model on the historical data, the extracted plurality of copper network equipment features, and the at least one additional copper network equipment feature to discover one or more historical operating behaviors or features of the copper network and/or of one or more copper network components that are indicative of or otherwise related to normal, typical, or prevailing operating behavior of the copper network and/or of its components. In an embodiment, the training 410 of the ML model may include utilizing one or more unsupervised learning techniques, so that such typical, prevailing, or normal operating behaviors or features may be determined by clustering or other similar data discovery techniques, for example. The discovered typical, prevailing, or normal operating behaviors or features may be indicative of, may be present, and/or may be characteristic of the copper network and/or its copper network components when the copper network and/or its components are operating within a desired, required, or target operating range. The desired, required, or target operating range may be defined by a set of boundaries, some of which may be partially pre-defined and/or some of which may be discovered or learned based on clusters or groupings in the historical copper network data. For example, at least a portion of the normal, typical, or prevailing operating range may be discovered during the training 410 of the ML model and/or by utilizing unsupervised learning techniques. In embodiments, the training 408 of the ML model may be performed in a manner similar to that described with respect to the training module 230 and/or as described elsewhere within this document.

In an embodiment (not shown), the method 400 may include validating the trained ML model, and tuning one or more hyperparameters based on the validation. For example, validating the trained ML model may include determining an excess mass curve score of the trained ML model, where the excess mass curve score may be generally indicative of an accuracy (e.g., a relative accuracy) of the ML model itself. Generally speaking, an excess mass curve score may be a score or result generated by applying a scoring function to excess mass curves of the ML model, e.g., in manners such as described elsewhere herein. A lesser excess mass curve score may be indicative of a less accurate ML model and a greater excess mass curve score may be indicative of a more accurate ML model, or vice versa, e.g., depending on the paradigm used for data representation. Accordingly, the method 400 may include determining an excess mass curve score of the ML model based on the excess mass curves of the trained ML model, adjusting one or more hyperparameters based on the excess mass curve score, and re-training the ML model based on the adjusted hyperparameters to generate a re-trained ML model. The re-trained ML model may be validated and a respective excess mass score may be determined therefrom, and one or more of the hyperparameters may be again adjusted based on the determined respective excess mass curve score. This cycle may be repeated until the excess mass curve score resulting from a most recent validation of a multiply re-trained ML model increases above a predetermined threshold or is maximized, or decreases below a predetermined threshold, is minimized, or is zero, e.g., based on the paradigm used to represent data points. Said another way, this cycle may be repeated until the hyperparameters of the training have been tuned. At this point, the most recently validated ML model may be the optimal ML model with the highest possible accuracy, and this ML model may be stored and utilized by the anomaly detector module 140 for detecting anomalies within the current copper network system 100 and corresponding sources of the detected anomalies.

At a block 412, the method 400 may include detecting, by the one or more processors based on current data of the copper network and by utilizing the trained ML model, one or more anomalies occurring in the copper network. For example, the method 400 may include detecting one or anomalies which are related to the behavior or a particular copper network equipment (e.g., a particular CPE or a particular DSLAM), detecting one or more anomalies correspond to a particular service operation which has been performed with respect to one or more copper network equipments, detecting one or more anomalies associated with a particular segment of a cable or line, etc. Generally speaking, the block 412 may include providing the current data generated by the copper network 100 as inputs into the trained ML model 135, the trained ML model 135 may execute on the provided inputs to detect one or more anomalies within the copper network 100 and/or within one or more of its components. The trained ML model 135 may generate one or more outputs indicative of the detected anomalies, for example. In some implementations, for each identified anomaly, the trained ML model 135 may also provide, at its output, one or more of: a respective likelihood that a detected anomaly is an actual anomaly, a respective likelihood that a particular copper network equipment is associated with the detected anomaly, and/or the like. In some implementations, the trained ML model 135 may provide, at its output, a ranking of respective likelihoods of the detected one or more anomalies being actual anomalies.

At a block 415, the method 400 may include initiating, responsive to the detecting, a mitigating action for the detected one or more anomalies occurring in the copper network. For example, when one or more detected anomalies are related to a particular copper network equipment, the initiating 415 of the mitigating action may include transmitting, to the particular copper network equipment, an instruction to change one or more settings of the particular copper network equipment, and/or may include causing a diagnostic or test corresponding to the particular copper network equipment to be executed. For example, when one or more detected anomalies are associated with the behavior of a DSLAM, the initiating 415 of the mitigating action may include initiating a re-routing, within the network 100, of a communication signal through a DSLAM other than the DSLAM associated with the detected anomalies. In some implementations, the initiating 415 of the mitigating action may include transmitting an instruction to another application executing within and/or in concert with the copper network (e.g., a diagnostic application, a routing application, a configuration application, a resource-throttling application, etc.) to initiate the mitigating action.

In some embodiments (not shown), the method 400 may include transmitting an indication of the detected one or more anomalies to a user interface, an application, or another computing device. For example, the method 400 may include, based on the detected one or more sources, transmitting an instruction or command to an application executing within the copper network 100 to initiate or take the mitigating action, such as re-routing traffic within the network, executing a diagnostic or a test, changing a setting and/or boundary condition, etc. Additionally or alternatively, in these embodiments, the method 400 may include transmitting an indication of the detected one or more anomalies to a user interface, such as a remote user interface 140 or a user interface of a computing device which has a direct wired and/or wireless connection with some component of the copper network (e.g., at the DSLAM 103, at an RG 106, etc.

In some embodiments (not shown), the method 400 may include augmenting the historical data with the current data prior to the extracting 405 of copper network features. In these embodiments, the extracting 402 of the copper network features may be from the augmented historical data, and the at least one additional copper network feature generated from the transforming 408 of the copper network features extracted from the augmented historical data may include at least one lagged or time-based feature. In these embodiments, the training 410 of the ML model may be based on the augmented historical data, the plurality of features extracted from the augmented historical data, and the additional features generated from transforming at least one feature included in the plurality of features extracted from the augmented historical data (in which the additional lagged or time-based feature is included).

In some embodiments (not shown), the method 400 may include updating the historical data to include information generated from executing a first instance of the method 400. For example, an indication of the extracted plurality of copper network equipment features, the at least one additional copper network equipment feature, the current data of the copper network, and the one or more anomalies may be historized as additional (or newly generated) historical data in the data stores 132. In these embodiments, the method 400 may also include extracting a second plurality of copper network equipment features from the updated historical data, transforming one or more features included in the second plurality of copper network equipment features to generate one or more additional copper network equipment features, retraining the machine learning model on the second extracted plurality of copper network equipment features, the one or more additional copper network equipment features, and updated current data of the copper network, and detecting, by utilizing the re-trained machine learning model, at least one anomaly in the copper network. As such, in this manner, subsequent anomaly detection may be performed (e.g., during subsequent executions of the method 400) using the most current training data indicative of historical copper network system 100 behavior, and therefore may further increase accuracy and speed of anomaly detection while further reducing the system resources needed to do so.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A computer-implemented method for detecting anomalies occurring in a copper network, the method comprising:
    obtaining, by one or more processors, historical data associated with a copper network, the historical data including data indicative of a multiplicity of historical copper network equipments, a multiplicity of historical operating behaviors of the copper network which have occurred, and a multiplicity of historical events corresponding to the copper network which have occurred;
    extracting, by the one or more processors and from the historical data, a plurality of copper network equipment features, each copper network equipment feature indicative of a respective behavior of a respective copper network equipment;
    transforming, by the one or more processors, at least one extracted copper network equipment feature, thereby generating at least one additional copper network equipment feature;
    training, by the one or more processors, a machine learning (ML) model on the extracted plurality of copper network equipment features and the at least one additional copper network equipment feature to discover one or more historical behaviors of the copper network, the one or more historical behaviors being indicative of the copper network operating within a target operating range, and the training including:
        validating the ML model, the validating including determining a set of excess mass curves of the ML model; and
        tuning one or more hyperparameters corresponding to the validating of the ML model, the tuning including adjusting the one or more hyperparameters based on the set of excess mass curves;
    detecting, by the one or more processors based on current data of the copper network and by utilizing the trained ML model, one or more anomalies occurring in the copper network; and
    initiating, by the one or more processors and responsive to the detecting, a mitigating action for the detected one or more anomalies occurring in the copper network.

2. The method of claim 1, wherein:
    the copper network includes a plurality of copper network equipments,
    the plurality of copper network equipments includes a plurality of customer premises equipments (CPEs) and a plurality of digital subscriber line access multiplexers (DSLAMs), and
    at least one of the detected one or more anomalies includes a particular copper network equipment of the plurality of copper network equipments.

3. The method of claim 2, wherein the particular copper network equipment is a particular CPE or a particular DSLAM.

4. The method of claim 2, wherein the initiating of the mitigating action includes at least one of:

transmitting an instruction to the particular copper network equipment to change one or more settings of the particular copper network equipment;
causing a diagnostic or test corresponding to the particular copper network equipment to be executed; or
when the particular copper network equipment is a particular DSLAM, causing a communication signal to be re-routed through a DSLAM other than the particular DSLAM.

5. The method of claim 1, wherein at least one of the detected one or more anomalies corresponds to a service operation that has been performed with respect to one or more copper network equipments included in the copper network.

6. The method of claim 1, further comprising optimizing the ML model, including cyclically performing:
re-training the machine learning model utilizing the adjusted one or more hyperparameters;
determining a respective set of excess mass curves of the re-trained machine learning model;
generating a respective excess mass curve score of the re-trained machine learning model based on the respective set of excess mass curves; and
re-adjusting the adjusted one or more hyperparameters, until the respective excess mass curve score is optimized, the optimized respective excess mass curve score corresponding to an optimization of the ML model.

7. The method of claim 1, wherein the detecting of the one or more anomalies occurring in the copper network includes detecting one or more features within the current data that are greater than a distance away from features corresponding to the discovered one or more historical behaviors.

8. The method of claim 7, further comprising tuning a sensitivity of anomaly detection by adjusting the distance.

9. The method of claim 1, further comprising augmenting, by the one or more processors, the historical data with the current data, and wherein:
the extracting of the plurality of copper network features from the historical data includes extracting the plurality of copper network features from the augmented historical data;
the at least one additional copper network equipment feature includes at least one lagged feature; and
the training of the machine learning model based on the historical data includes training the machine learning model based on the augmented historical data, the plurality of copper network features extracted from the augmented historical data, and the at least one lagged feature.

10. The method of claim 1, wherein:
the extracted plurality of copper network equipment features include one or more of: link retrains, errored seconds, noise margins, or attenuation; and
the additional copper network equipment features include one or more of: a mean, a median, a minimum, a maximum, a standard deviation, an aggregated feature, a lagged feature, or a leave-one-out average of the at least one of the link retrains, the errored seconds, the noise margins, or the attenuation.

11. The method of claim 1, further comprising at least one of:
ranking respective likelihoods of the detected one or more anomalies being actual anomalies, and wherein the initiating of the mitigating action is based on the ranking; or
transmitting, by the one or more processors, an indication of the detected one or more anomalies to at least one of: a user interface, an application, or a computing device.

12. The method of claim 1, wherein the extracted plurality of copper network equipment features is a first extracted plurality of copper network equipment features, and the method further comprises:
updating the historical data to include an indication of the first extracted plurality of copper network equipment features, the at least one additional copper network equipment feature and the current data of the copper network;
extracting a second plurality of copper network equipment features from the updated historical data;
transforming one or more features included in the second plurality of copper network equipment features to generate one or more additional copper network equipment features;
re-training the machine learning model on the second extracted plurality of copper network equipment features and the one or more additional copper network equipment features; and
detecting, by utilizing the re-trained machine learning model, at least one anomaly in the copper network.

13. A system for detecting anomalies in a copper network, the system comprising:
one or more processors; and
one or more memories storing computer-executable instructions that, when executed, cause the one or more processors to:
obtain historical data associated with a copper network, the historical data including data indicative of a multiplicity of historical copper network equipments, a multiplicity of historical operating behaviors of the copper network which have occurred, and a multiplicity of historical events corresponding to the copper network which have occurred;
extract, from the historical data, a plurality of copper network equipment features, each copper network equipment feature indicative of a respective behavior of a respective copper network equipment;
transform at least one extracted copper network equipment feature to generate at least one additional copper network equipment feature;
train a machine learning (ML) model on the historical data, the extracted plurality of copper network equipment features, and the at least one additional copper network equipment feature to discover one or more historical features of the copper network that are indicative of the copper network operating within a target operating range, the training of the ML model including (i) a validation of the ML model, the validation including a determination of a set of excess mass curves of the ML model, and (ii) a tuning of one or more hyperparameters corresponding to the validation of the ML model, the tuning including an adjustment of the one or more hyperparameters based on the set of excess mass curves;
detect, based on current data of the copper network and by using the trained ML model, one or more anomalies occurring in the copper network; and
initiate a mitigating action for the detected one or more anomalies occurring in the copper network.

14. The system of claim 13, wherein:
the copper network includes a plurality of copper network equipments, the plurality of copper network equipments includes a plurality of customer premises equipments (CPEs) and a plurality of digital subscriber line access multiplexers (DSLAMs), and at least one of the detected one or more anomalies corresponds to a particular copper network equipment of the plurality of copper network equipments.

15. The system of claim 14, wherein the particular copper network equipment is a particular CPE, and the mitigating action is for the particular CPE.

16. The system of claim 14, wherein the particular copper network equipment is a particular DSLAM, and the mitigating action is for the particular DSLAM.

17. The system of claim 16, wherein the mitigating action includes a re-routing of a communication signal through a DSLAM other than the particular DSLAM.

18. The system of claim 14, wherein the mitigating action is a change to one or more settings of the particular copper network equipment.

19. The system of claim 14, wherein the mitigating action is a diagnostic of the particular copper network equipment.

20. The system of claim 13, wherein at least one of the detected one or more anomalies corresponds to a service operation that has been performed with respect to one or more copper network equipments included in the copper network.

21. The system of claim 13, wherein:
the computer-executable instructions when executed, cause the one or more processors further to augment the historical data with the current data;
the extraction of the plurality of copper network features from the historical data includes an extraction of the plurality of copper network features from the augmented historical data;
the at least one additional copper network equipment feature includes at least one lagged feature; and
the training of the machine learning model on the historical data includes a training of the machine learning model on the augmented historical data, the plurality of copper network features extracted from the augmented historical data, and the at least one lagged feature.

22. The system of claim 13, wherein the extracted plurality of copper network equipment features include one or more of: link retrains, errored seconds, noise margins, or attenuation.

23. The system of claim 13, wherein the additional copper network equipment features include one or more of: a mean, a median, a minimum, a maximum, a standard deviation, an aggregated feature, a lagged feature, or a leave-one-out average.

24. The system of claim 13, wherein training of the ML model includes an optimization of the ML model, and the optimization of the ML model includes the validation of the ML model and the tuning of the one or more hyperparameters.

25. The system of claim 13, wherein:
the validation of the ML model is a first validation; and
a second validation of the ML model re-trained based on the adjusted hyperparameters results in a reduction of an adjusted excess mass curve score determined based on a set of excess mass curves of the re-trained ML model.

26. The system of claim 13, wherein the training of the ML model utilizes an isolation forest algorithm, and the one or more hyperparameters include at least one of (i) a number of trees, (ii) a tree depth, or (iii) a sample size.

27. The system of claim 13, wherein the extracted plurality of copper network equipment features is a first extracted plurality of copper network equipment features, and the computer-executable instructions when executed, cause the one or more processors further to:
update the historical data to include an indication of the first extracted plurality of copper network equipment features, the at least one additional copper network equipment feature, and the current data of the copper network;
extract a second plurality of copper network equipment features from the updated historical data;
transform one or more features included in the second plurality of copper network equipment features to generate one or more additional copper network equipment features;
re-train the machine learning model on the second extracted plurality of copper network equipment features and the one or more additional copper network equipment features; and
detect, by utilizing the re-trained machine learning model, at least one source of at least one anomaly in the copper network.

* * * * *